United States Patent
Jung et al.

(10) Patent No.: US 10,687,323 B2
(45) Date of Patent: Jun. 16, 2020

(54) BEAMFORMED PHYSICAL DOWNLINK CONTROL CHANNEL

(71) Applicant: Intel IP Corporation, Santa Clara, CA (US)

(72) Inventors: Hyejung Jung, Palatine, IL (US); Huaning Niu, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 16/083,141

(22) PCT Filed: Jun. 23, 2016

(86) PCT No.: PCT/US2016/038954
§ 371 (c)(1),
(2) Date: Sep. 7, 2018

(87) PCT Pub. No.: WO2017/155564
PCT Pub. Date: Sep. 14, 2017

(65) Prior Publication Data
US 2019/0387504 A1 Dec. 19, 2019

Related U.S. Application Data

(60) Provisional application No. 62/306,903, filed on Mar. 11, 2016.

(51) Int. Cl.
*H04W 72/04* (2009.01)
*G06F 17/14* (2006.01)
(Continued)

(52) U.S. Cl.
CPC ........ *H04W 72/042* (2013.01); *G06F 17/142* (2013.01); *H04B 7/0617* (2013.01);
(Continued)

(58) Field of Classification Search
CPC .............. H04W 72/042; H04W 72/005; H04L 27/2666; H04L 5/001; H04L 5/0023;
(Continued)

(56) References Cited

U.S. PATENT DOCUMENTS 10,491,328 B2 * 11/2019 Jung ............... H04L 1/0038
2013/0064215 A1 * 3/2013 Gao ................ H04L 5/0055
370/330

(Continued)

FOREIGN PATENT DOCUMENTS

WO WO-2017155564 A1 9/2017

OTHER PUBLICATIONS

"International Application Serial No. PCT/US2016/038954, International Search Report dated Nov. 28, 2016", 5 pgs.
(Continued)

*Primary Examiner* — Christopher P Grey
(74) *Attorney, Agent, or Firm* — Kowert, Hood, Munyon, Rankin & Goetzel, P.C.

(57) ABSTRACT

Embodiments of beamformed physical downlink control channel (B-PDCCH) are generally described herein. A user equipment (UE) decodes an indication of a transmission mode for a beamformed physical downlink control channel (B-PDCCH) received from a network entity. The UE decodes one or more symbol blocks corresponding to a downlink (DL) control region of a subframe, wherein the DL control region includes one or more control clusters, and wherein one discrete Fourier transform (DFT) spreading window is applied in each of the one or more control clusters. The UE determines a B-PDCCH search space according to the indicated transmission mode, wherein the B-PDCCH search space is a set of B-PDCCH candidate locations. The UE performs blind decoding of one or more B-PDCCHs based on the determined B-PDCCH search
(Continued)

space, to obtain downlink control information transmitted from one or more evolved NodeBs (eNBs) to the UE via the one or more B-PDCCHs.

24 Claims, 13 Drawing Sheets

(51) Int. Cl.
    *H04B 7/06*     (2006.01)
    *H04L 27/26*     (2006.01)
    *H04L 5/00*     (2006.01)
    *H04W 72/00*     (2009.01)

(52) U.S. Cl.
    CPC .......... *H04L 5/001* (2013.01); *H04L 27/2666* (2013.01); *H04W 72/005* (2013.01)

(58) Field of Classification Search
    CPC ....... H04L 1/00; H04L 5/0048; H04L 5/0091; H04L 1/1896; H04L 1/0072; H04L 1/0046; H04L 5/0053; H04B 7/0617; G06F 17/142
    See application file for complete search history.

(56) References Cited

U.S. PATENT DOCUMENTS

2013/0070703 A1*   3/2013   Yasukawa ............ H04L 5/0091
                                                                                                                                      370/329
2014/0105150 A1    4/2014   Kim et al.
2015/0009883 A1    1/2015   Bai et al.
2019/0229825 A1*   7/2019   Ahn ...................... H04W 88/06

OTHER PUBLICATIONS

"International Application Serial No. PCT/US2016/038954, Written Opinion dated Nov. 28, 2016", 7 pgs.

Christian, Ibarsr, et al., "A comparison of waveform candidates for 5G millimeter wave systems", In: 2015 IEEE 49th Asilomar Conference on Signals, Systems and Computers, (Nov. 2015), 1747-1751.

Utsaw, Kumar, et al., "A Waveform for 5G: Guard Interval DFT-s-OFDM", In: 2015, IEEE GLOBECOM Workshops, (Dec. 2015), 1-6.

\* cited by examiner

US 10,687,323 B2

BEAMFORMED PHYSICAL DOWNLINK CONTROL CHANNEL

PRIORITY CLAIM

This application is a U.S. National Stage Filing under 35 U.S.C. 371 from International Application No. PCT/US2016/038954, filed on Jun. 23, 2016, and published as WO 2017/155564, which claims priority under 35 U.S.C. § 119 to U.S. Provisional Patent Application Ser. No. 62/306,903, filed Mar. 11, 2016, and titled, "BEAMFORMED PHYSICAL DOWNLINK. CONTROL CHANNEL FOR GUARD INTERVAL OR ZERO TAIL DFT SPREAD OFDM SYSTEMS," which is incorporated herein by reference in its entirety.

TECHNICAL FIELD

Embodiments pertain to wireless communications. Some embodiments relate to beamformed physical downlink control channels in physical layer of fifth generation (5G) cellular systems. Some embodiments relate to beamformed physical downlink control channel for guard interval or zero tail discrete Fourier transform spread orthogonal frequency division multiplexing systems.

BACKGROUND

In a cellular network, a user equipment (UE) receives downlink control information from an evolved NodeB (eNB) via physical downlink control channel. In some cases, the received downlink control information is encoded.

Thus, there are general needs for techniques to decode downlink control information transmitted using physical downlink control channel.

DETAILED DESCRIPTION

Figure 1:
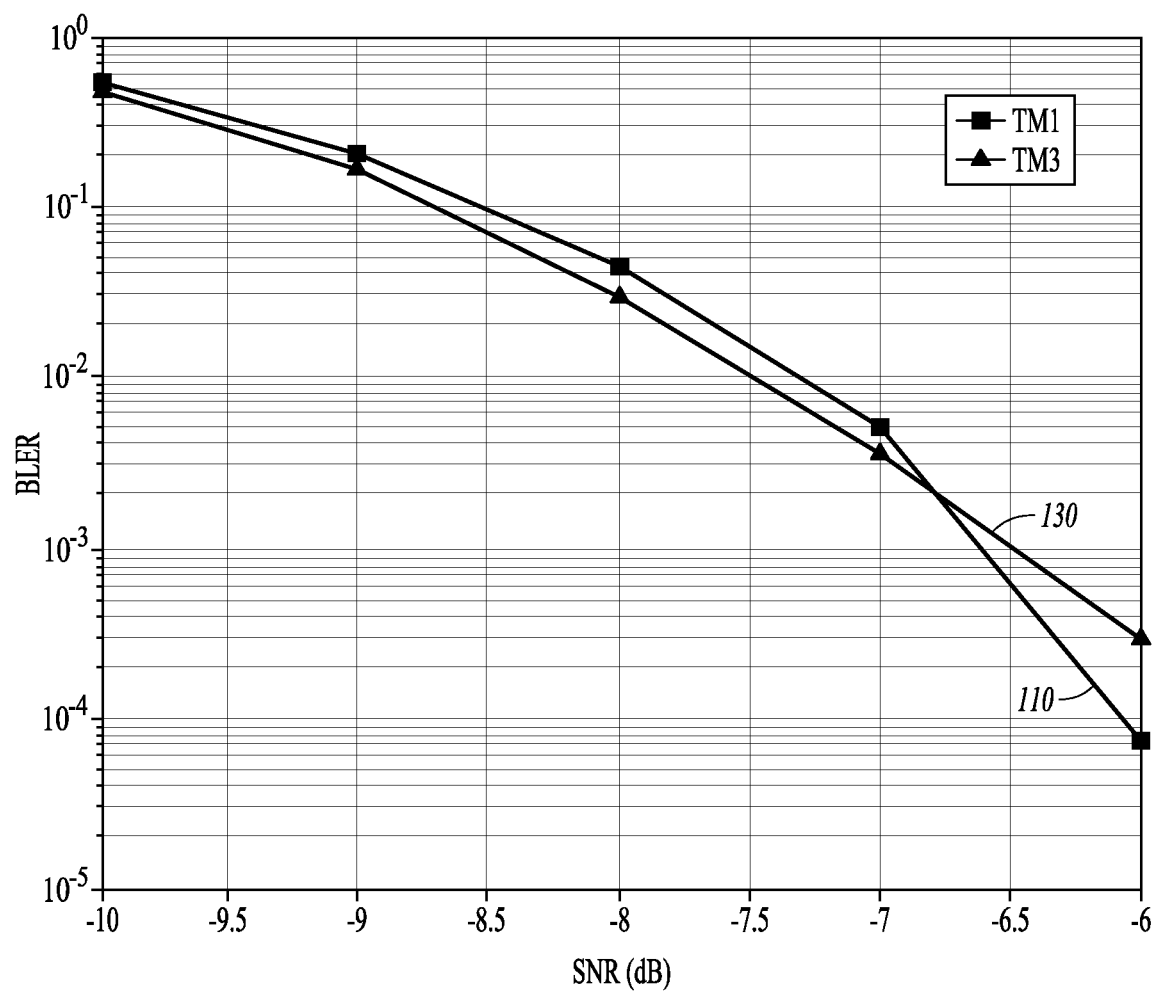
FIG. 1 is an example graph of block error rate versus signal to noise ratio in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In fifth generation (5G) wireless communication systems, transmit/receive beamforming based on a large number of antennas, also known as a massive multi-input multi-output (MIMO) system, is one feature to increase spectral efficiency and to extend cellular communication into frequency bands above 6 GHz. Beamformed physical downlink control channel (B-PDCCH) is designed to efficiently support beamforming-centric system operation and flexible multi-point transmission for seamless user experience under conditions of mobility and channel blockage, mainly assuming Orthogonal Frequency Division Multiplexing (OFDM) based transmission.

In millimeter wave (mmWave) frequency bands, an energy efficient waveform, for example, a low peak-to-average power ratio (PAPR) waveform may be used, due to relatively low power amplifier (PA) efficiency at high frequency bands and high power consumption from analog-to-digital converters (ADC) operated with a high sampling rate. Discrete Fourier Transform spread (DFT-s) waveforms, such as cyclic prefix (CP) DFT-s-OFDM, zero-tail (ZT) DFT-s-OFDM, and guard interval (GI) DFT-s-OFDM are good candidate waveforms for mmWave systems, as, in some cases, they provide better PAPR performances than OFDM and better spectral efficiency than single-carrier waveforms. Furthermore, in some implementations, ZT DFT-s-OFDM and GI DFT-s-OFDM offer flexible ZT/GI length adaptation to channel condition, without changing symbol block timing and DFT size. CP based length adaptation has limited flexibility, and resulting symbol block timing differences among different cells make it difficult to perform inter-cell interference coordination or cancellation similar to asynchronous network. Thus, it may be desirable to design physical channels for ZT DFT-s-OFDM or GI DFT-s-OFDM based mmWave systems.

The existence of zero tail or guard interval along with maintaining a single-carrier property in ZT/GI DFT-s-OFDM imposes, in some cases, some restrictions in terms of resource allocation and multi-user multiplexing compared to OFDM. The physical channel design takes those aspects into account. In some cases, a demodulation reference signal (DM RS) design and a channel estimation technique for GI-DFT-s-OFDM may be used in conjunction with some aspects of the subject technology.

Some implementations of the subject technology are directed to a beamformed physical downlink control channel, which carries downlink control information (DCI), for ZT DFT-s-OFDM or GI DFT-s-OFDM systems.

Several GI/ZT DFT-s-OFDM based control channel structures which are suitable for different hybrid beamforming architectures are disclosed herein. Search spaces are provided for each transmission mode. For multiplexing multiple B-PDCCHs and corresponding DM RS, a "control cluster" including one or more modulation symbol blocks and a "symbol element (SE)" are defined in a time-domain symbol block grid, and one-dimensional DFT-spreading is applied to the symbol elements (the modulation symbols of a given symbol block of the control cluster). Three transmission modes are described below.

Transmission Mode 1: Since fully connected hybrid beamforming, which combines multiple RF chains before power amplification (e.g., as described in greater detail in conjunction with FIG. 3, below), may increase PAPR, only one control cluster (one DFT-spreading window), is employed for the allocated control region bandwidth or system bandwidth, in order to maintain low PAPR. Multiple distinctively beamformed. DM RS ports are time-multiplexed within a symbol block, and symbol element groups (SEG) or symbol element (SE) level interleaving is applied within the cluster to exploit the time-diversity and randomize the beam interference.

Transmission Mode 2: With fully connected hybrid beamforming and low network load, one beamformed DM RS port occupies one symbol block to enhance the channel estimation performance, and an adjacent symbol block is used for B-PDCCH transmission. One or more B-PDCCHs with the same transmit (Tx) beamforming weights are multiplexed within the symbol block. Multiple pairs of DM RS and B-PDCCH symbol blocks, each pair associated with one Tx beam, can be configured in the downlink (DL) control region.

Transmission Mode 3: For sub-array based hybrid beamforming (e.g., as described in greater detail in conjunction with FIG. 7, below), power amplification is done in each sub-array connected to one RF chain, and accordingly each sub-array can employ one control cluster. That is, multiple DFT-spreading windows can be employed for the allocated control region bandwidth or system bandwidth without increasing PAPR, and multiple clusters' DFT-spread output are frequency multiplexed. In each control cluster, one DM RS port and one or more B-PDCCHs with the same Tx beam are transmitted.

Some aspects of the subject technology provide a downlink control channel design for ZT or GI based DFT-s-OFDM systems.

In some implementations, the subject technology allows an access point (AP) or evolved NodeB (eNB) to select one of the transmission modes described above according to its Tx beamforming architecture and system load condition, and the selection may be indicated to a user equipment (UE) via a master information block (MIB) or system information block (SIB).

In Transmission Mode (TM) 1, the multi-user inter-symbol interference can be mitigated, by defining a sub-cluster where spatially separated DM RS ports may be adjacently placed within a symbol block of the sub-cluster and spatially separated data symbols may be interleaved. The allowed sub-cluster sizes are adjusted, depending on delay spread of effective channel, i.e., the ZT or GI length.

FIG. 1 illustrates an example graph 100 of block error rate (BLER) versus signal to noise ratio (SNR) for TM1 110 and TM3 130. BLER is on the y-axis and SNR (measured in decibels (dB)) is on the x-axis. The graph 100 shows BLER performance of GI-DFT-s-OFDM based B-PDCCH with 44 bit DCI, 8 control channel element (CCE) aggregation level, additive white Gaussian noise (AWGN), 1 Tx antenna, and 2 receive (Rx) antennas.

The graph 100 demonstrates that TM1 110 and TM3 130 result in similar BLER performances in the AWGN channel. After beamforming with a large number (e.g., at least 1 Tx and 2 Rx) of antennas, the effective channels become similar to flat fading channels. Thus, TM1 and TM3 perform similarly in mmWave beamformed channels (under the same beamforming gain), and can accommodate different beamforming architectures.

Table 1 shows example physical-layer system parameters, including symbol, sub-frame, and frame durations, which are used to illustrate example ZT/GI-DFT-s-OFDM based B-PDCCH transmission structures.

TABLE 1

Example system parameters

| Parameter | Value |
|---|---|
| System bandwidth | 1 GHz |
| FFT size (N) | 2048 |
| Subcarrier frequency spacing | 750 KHz |
| Sample rate | 1536 MHz |
| Sampling time ($T_s$) | 0.65104 ns |
| Total number of subcarriers (K) | 1200 |
| IDFT/DFT period | 1333 ns |
| Guard Interval duration ($N_{GI}$) | Part of DFT period, and adaptable among $158T_s$, $106T_s$, $50T_s$, and $26T_s$ |
| Number of symbol blocks per subframe | 75 |
| Subframe duration | 0.1 ms (=$153600T_s$) |
| Frame duration ($T_f$) | 1 ms (=$536000T_s$) |

Figure 2A:
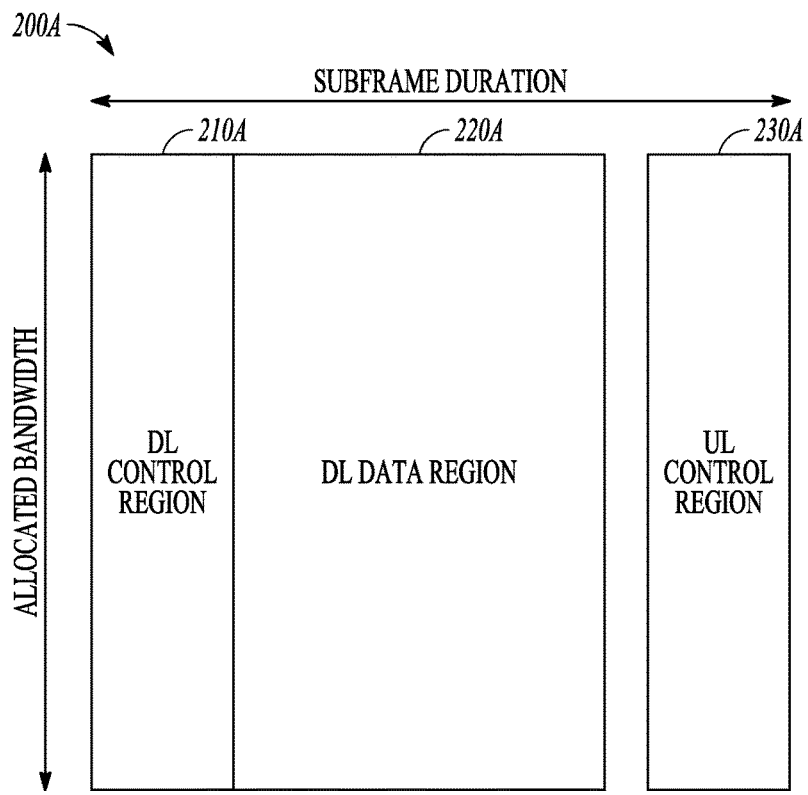
FIG. 2A illustrates an example time division duplex subframe structure in accordance with some embodiments.

FIG. 2A illustrates an example time division duplex (TDD) subframe structure 200A. As shown, the TDD subframe structure 200A includes a downlink (DL) control region 210A, a DL data region 220A, and an uplink (UL) control region 230A. Control and data regions are time multiplexed as shown in FIG. 2A to accommodate flexible multiplexing of DL and UL control information within a subframe.

Figure 2B:
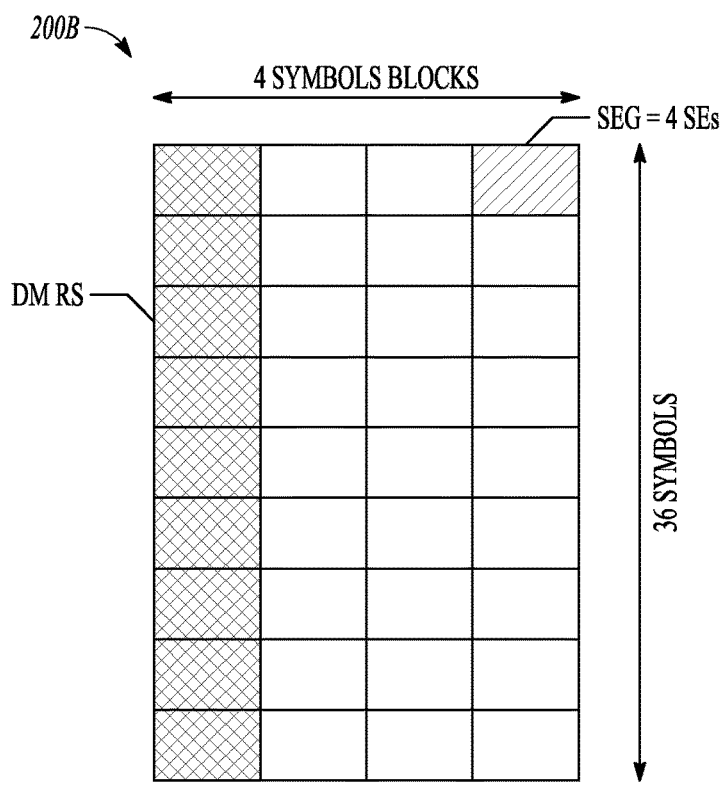
FIG. 2B illustrates an example control cluster in accordance with some embodiments.

FIG. 2B illustrates an example control cluster 200B. For a family of DFT-s-OFDM waveforms including GI- or ZT-DFT-s-OFDM, a "control cluster" is defined in a time-domain symbol block grid as illustrated in FIG. 2B, where the example control cluster includes 36 modulation symbols, for example, Quadrature Phase Shift Keying (QPSK) symbols. As shown, four symbol blocks are equal to the DL control region size. One-dimensional DFT-spreading via 36-point FFT is applied to the modulation symbols of a given symbol block of the control cluster. Furthermore, DFT-spreading outputs of the symbol block of the control cluster are mapped to a set of contiguous subcarriers in the frequency domain.

Figure 3:
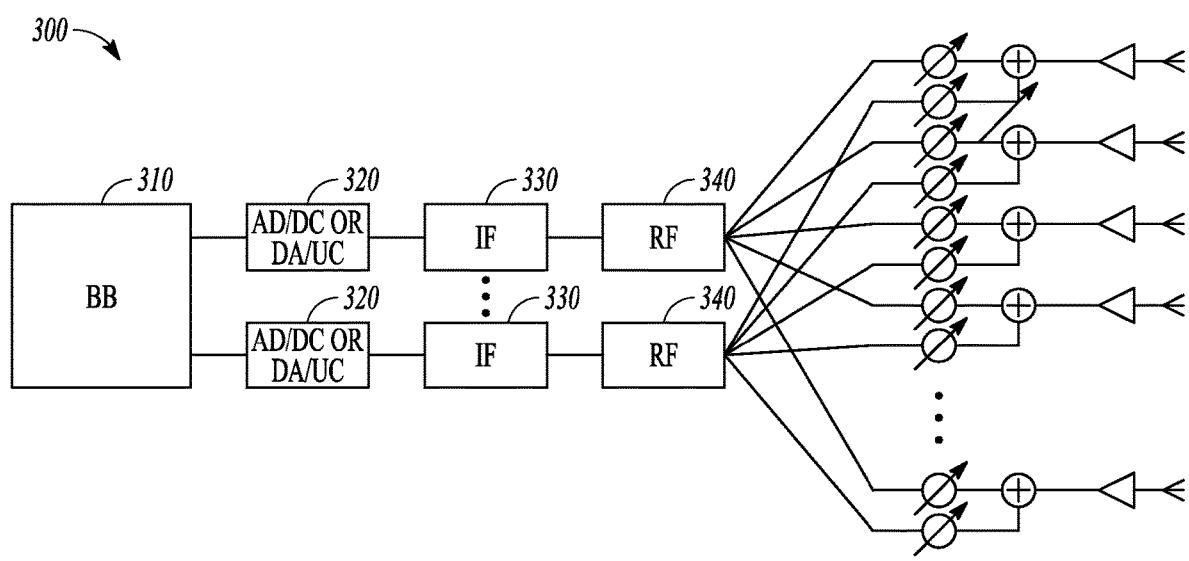
FIG. 3 illustrates an example full flexible hybrid beamforming architecture in accordance with some embodiments.
Figure 4:
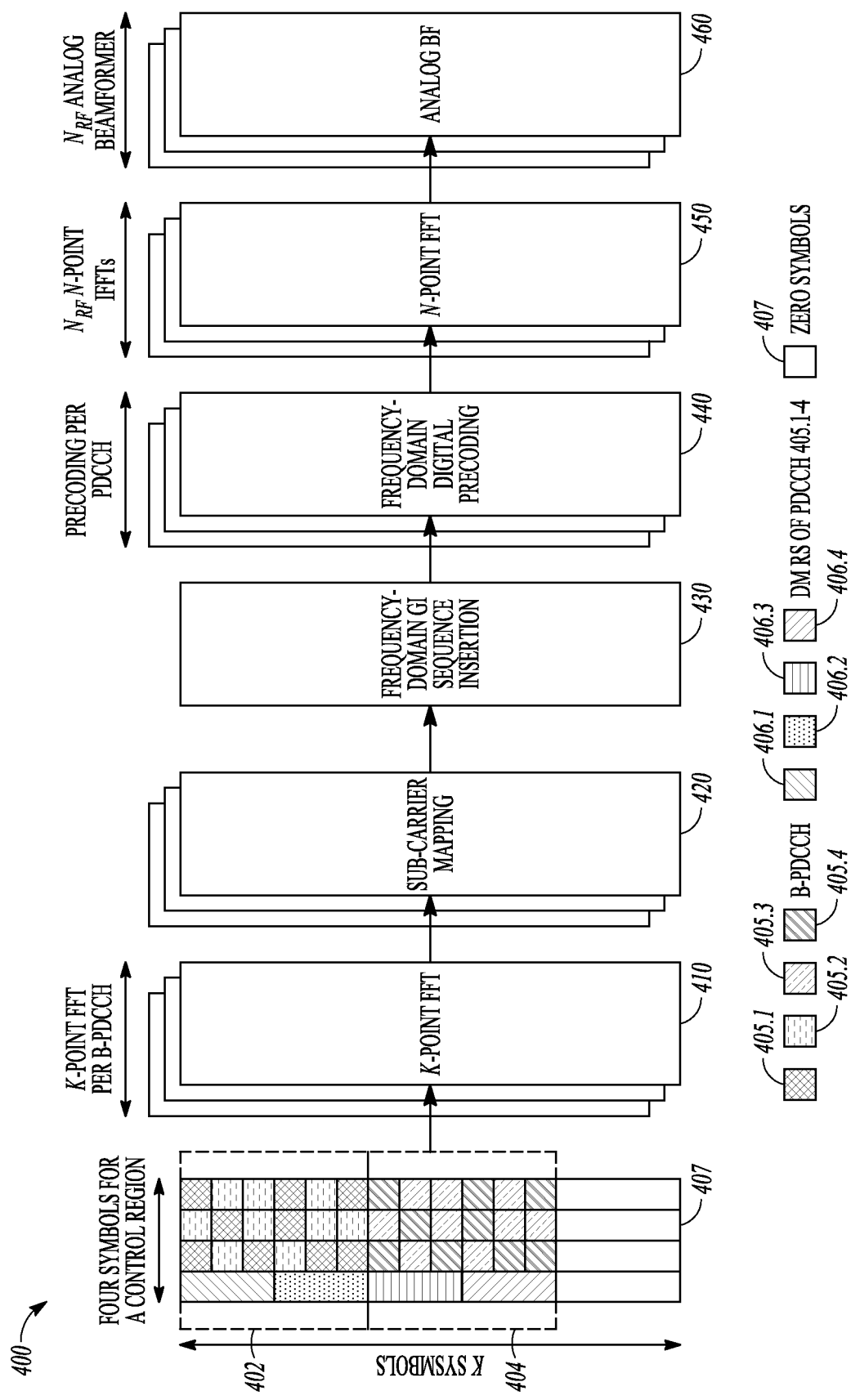
FIG. 4 illustrates time-domain multiplexing of multiple demodulation reference signal within one cluster in accordance with some embodiments.
Figure 5:
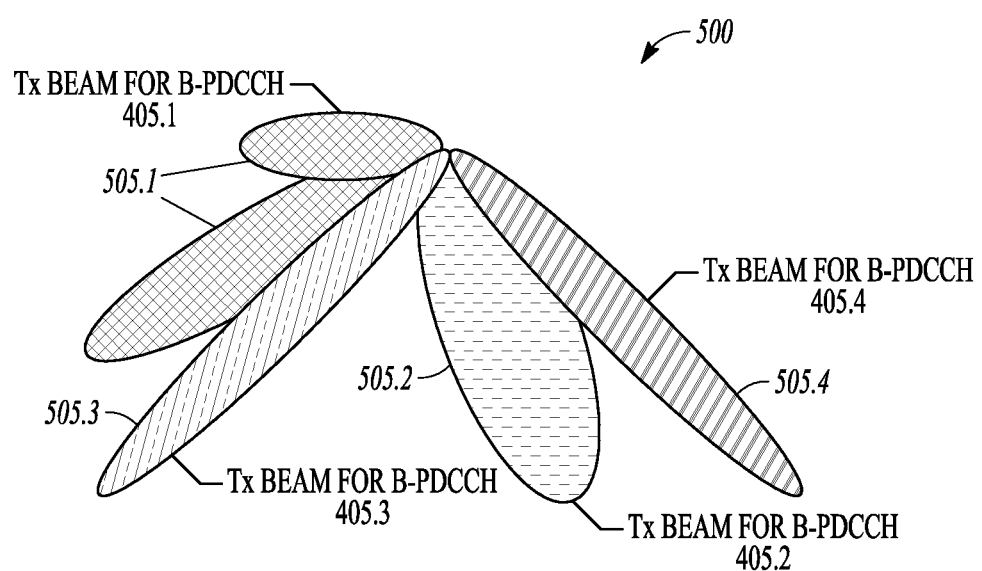
FIG. 5 illustrates transmit beams for the beamformed physical downlink control channel transmission in accordance with some embodiments.

FIGS. 3-5, discussed below, relate to transmission mode 1.

In some embodiments of transmission mode 1, only one control cluster exists in the DL control region, and multiple B-PDCCHs, each beamformed with either the same or distinctive Tx beamforming weights, are multiplexed and DFT-spread within one cluster. Assuming that K is the number of subcarriers in a system bandwidth or in an allocated bandwidth for DL control transmission, the control cluster consists of K symbols per symbol block and outputs of K-point FFT are mapped to K consecutive subcarriers. For ZT/GI DFT-s-OFDM, the maximum number of non-zero modulation symbols per symbol block is given by $$K' = K - \left\lceil \frac{N_{GI}}{N} \cdot K \right\rceil,$$

where $N_{GI}$ denotes the GI length in the samples, and N is the number of samples per symbol block. As DFT-spreading is applied to the entire allocated bandwidth, PAPR or cubic metric (CM) is, in some cases, expected to be as low as single-carrier transmission. This transmission mode is suitable when all B-PDCCHs are transmitted from one AP (e.g. one macro eNB) and the AP employs a fully connected hybrid beamforming architecture.

FIG. 3 illustrates an example full flexible hybrid beamforming architecture 300. As shown the beamforming architecture 300 includes a baseband (BB) block 310. The BB block 310 communicates with the analog-to-digital/down conversion (AD/DC) or digital-to-analog/up conversion (DA/UC) blocks 320, which communicate with the intermediate frequency (IF) blocks 330, which communicate with the radio frequency (RF) blocks 340. For a transmitter, the RF blocks 340 generate output front the beamforming architecture 300. In some cases, the beamforming architecture can be implemented without the IF blocks 330.

FIG. 4 illustrates time-domain multiplexing 400 of multiple demodulation reference signal (DM RS) within one cluster for TM1. As shown, there are two sub-clusters 402 and 404, and four symbol blocks per control region. There are four B-PDCCHs 405.1-4 and four DM RS 406.1-4 of the B-PDCCHs 405.1-4, as well as zero symbols 407. K-point fast Fourier transform (FFT) 410, sub-carrier mapping 420, frequency-domain GI sequence insertion 430, frequency domain digital preceding 440, N-point inverse FFT (IFFT) 450, and analog beamforming (BF) 460 are applied to the B-PDCCHs 405.1-4.

FIG. 4 shows an example on how multiple B-PDCCHs 405.1-4 and corresponding DM RS ports 406.1-4 are multiplexed within the control cluster. In the illustrated example, there are two sub-clusters 402 and 404 in the control cluster, and two B-PDCCHs 405.1-2 and 405.3-4 with different Tx beamforming weights are multiplexed in each sub-cluster.

FIG. 5 illustrates Tx beams for the B-PDCCH transmission. Tx beam 505.1 is the Tx beam for B-PDCCH 405.1. Tx beam 505.2 is the Tx beam for B-PDCCH 405.2. Tx beam 505.3 is the Tx beam for B-PDCCH 405.3. Tx beam 505.4 is the Tx beam for B-PDCCH 405.4.

As illustrated in FIG. 5, B-PDCCH 405.1 and B-PDCCH 405.2 whose Tx beams are well separated in terms of angle of departure (AoD) are multiplexed in the sub-cluster 402, in order to minimize the impact of inter-symbol interference. Symbol element groups (SEGs) consisting of 4 symbol elements (SEs) or SEs for each B-PDCCH are interleaved within a sub-cluster to provide time-diversity and randomization of inter-cell beam interference. The first symbol block is used for DM RS transmission, and spatially separated DM RS ports are placed adjacently in the DM RS symbol block.

Assuming that B-PDCCH 405.1 is intended to a specified user equipment (UE) called UE1, the received data or DM RS on subcarrier k at UE1's receiver is given by Equation 1.

$$Y_1(k) = H_1(k) \cdot \sum_{u=1}^{U} P_u(k) X_u(k) + \qquad \text{Equation 1}$$

-continued
$$H_1(k) \cdot \left( \frac{1}{\sqrt{U}} \sum_{u=1}^{U} P_u(k) \right) X_{GI}(k) + V(k),$$

In Equation 1, $X_u(k)$ is an output of K-point FFT of K×1 symbol vector $x_u$ for B-PDCCH u, which is mapped into subcarrier k, $X_{GI}(k)$ is a frequency-domain GI sequence mapped into subcarrier k. $H_1(k)$ is an $N_r \times N_t$ matrix of effective channel frequency response on subcarrier k taking into account Tx/Rx analog beamforming, where $N_t$ and $N_r$ are transmit and receive number of RF chains, respectively, $V(k)$ is an $N_r \times 1$ additive white Gaussian noise (AWGN) vector, and $P_u(k)$ is an $N_t \times 1$ digital precoding vector at subcarrier k, and $\|P_u(k)\|^2 = 1$. Without spatial multiplexing of B-PDCCHs, the symbol vector $x_u = [x_u[0], x_u[1], \ldots, x_u[K-1]]^T$ satisfies Equation 2.

$$\sum_{u=1}^{U} E\{|x_u[m]|^2\} = \begin{cases} \delta_s^2, & \text{if } m = 0, 1, \ldots, K - K_z - 1, \\ 0, & \text{if } m = K - K_z, \ldots, K - 1 \end{cases}, \qquad \text{Equation 2}$$

In Equation 2, $E\{|x_u[m]|^2\} = 0$ or $\delta_s^2$ for a given m, and $K_z$ is the number of zero symbols inserted in each symbol block of the control cluster. Power of time-domain samples $x_{GI}[n]$ for the GI sequence is set according to Equation 3.

$$E\{|x_{GI}[n]|^2\} = \begin{cases} 0, & \text{if } n = 0, 1, \ldots, N - N_{GI} - 1, \\ \frac{N \cdot K_z}{N_{GI} \cdot K} \delta_s^2, & \text{If } n = N - N_{GI}, \ldots, N - 1 \end{cases} \qquad \text{Equation 3}$$

In Equation 3, the frequency-domain GI sequence $X_{GI}(k)$ satisfies $\sum_{u=1}^{U} E\{|X_u(k)|^2\} + E\{|X_{GI}(k)|^2\} = \delta_s^2$, for $k \in \{0, 1, 2, \ldots, K-1\}$.

In some embodiments, a channel estimator at the receiver may further extract time-domain samples of the DM RS symbol block corresponding to a target sub-cluster and its neighborhood, and insert zeroes for other sample positions before N-point FFT to mitigate the multi-user DM RS interference. For frequency-domain channel estimation, DM RS for B-PDCCH 1, $X_1(k)$, is applied to the N-point FFT output $Y_1(k)$, resulting in $\tilde{Y}_1(k) = Y_1(k) X_1^*(k)$ as set forth in Equation 4.

$$\tilde{Y}_1(k) = H_1(k) P_1(k) |X_1(k)|^2 + \qquad \text{Equation 4}$$
$$\sum_{u=2}^{U} H_1(k) P_u(k) \left( X_u(k) + \frac{1}{\sqrt{U}} X_{GI}(k) \right) X_1^*(k) + V(k) X_1^*(k).$$

If UE1's propagation channel has little or no energy toward a beam direction determined by the precoder $P_u(k)$, the interference from B-PDCCH u can be negligible, that is, $\|H_1(k) P_u(k)\|^2 \approx 0$. The time-domain samples of the received signal are channel convoluted and upsampled version of transmitted symbols of the control cluster. Thus, placing spatially separated DM RS ports adjacently in time at the transmitter and zeroing out far away samples corresponding to the pure interference (with respect to the target sub-cluster) at the receiver may improve the channel estimation performance without losing the desired signal.

In some embodiments, a B-PDCCH candidate in a blind decoding search space for TM1 is determined by a sub-cluster and control channel elements (CCEs) within the sub-cluster. In one example, a CCE consists of 9 SEGs. Assuming that two DM RS ports are multiplexed in one sub-cluster, the sub-cluster size $K_s$ in terms of the number of symbol elements (SEs) per symbol block may be set to satisfy $$\frac{K_s}{2} > 2K_z,$$

where $K_z$ is determined, based on the maximum delay spread. That is, the DM RS length is set to be longer than twice of the maximum delay spread to avoid the entire received DM RS samples being corrupted by the multi-user DM RS inter-symbol interference. Thus, the allowed sub-cluster sizes and corresponding search spaces may vary depending on the zero symbol length $K_z$ (or the GI length $N_{GI}$), as shown in Tables 2-5. Once an AP or an eNB selects one GI length based on the estimated or reported maximum delay spread information and informs UEs of the selected GI length via MIB, SIB, a dedicated higher-layer message, or a DCI message, the UEs apply a proper search space for the indicated GI length. The total number of blind decoding is set to 18 for all the search space examples in Tables 2-5, where $N_{ctrl}$ denotes the number of symbol blocks in the control cluster.

It is assumed that the sub-clusters in Tables 2-5 have two DM RS ports, unless specified. For a given symbol block of the DL control region, the SEs corresponding to the candidate sub-cluster $m_1$ which has 2 or more DM RS ports are given by Equation 5.

$$K_s \left\{ \left( \left\lfloor \frac{K' \cdot m_1}{K_s \cdot M_1^{(L)}} \right\rfloor + (Y_k + b) \bmod \left\lfloor \frac{K'}{K_s \cdot M_1^{(L)}} \right\rfloor \right) \bmod \lfloor K'/K_s \rfloor \right\} + i, \quad \text{Equation 5}$$

In Equation 5, $m_1=0, 1, \ldots, M_1^{(L)}-1$, and $i=0, 1, \ldots, K_s-1$. $K'$, $K_s$, and $M_1^{(L)}$ denote the number of non-zero symbols per symbol bock in the control cluster, the sub-cluster size in SEs per symbol block, and the number of sub-cluster candidates. $Y_k$ represents a UE hashing function which is dependent on a UE identity, a subframe number, and other parameters. The UE hashing function of Equation 6 can be used.

$$Y_k = (A \cdot Y_{k-1}) \bmod D \quad \text{Equation 6}$$

In Equation 6, $Y_1 = n_{RNTI} \neq 0$, $A=39827$, $D=65537$ and $k=\lfloor n_s/2 \rfloor$, $n_s$ is the slot number within a radio frame. The Radio Network Temporary Identifier. (RNTI) value is used for $n_{RNTI}$. $b=n_{CI}$ if the UE is configured with a carrier indicator field to support cross-carrier scheduling in carrier aggregation, otherwise $b=0$. $n_{CI}$ is the carrier indicator field value. Special sub-clusters with 1 DM RS port are defined in Tables 4-5, to fully exploit the available radio resource. The SEs for the special sub-cluster in Tables 4-5 are given by $576+288+i$ and $576+i$, respectively, for $i=0, 1, \ldots, K_s-1$. The CCEs corresponding to the candidate B-PDCCH $m_2$ within a sub-cluster are given by Equation 7.

$$L \left\{ \left( Y_k + \left\lfloor \frac{N_{CCE}^{(K_s)} \cdot m_2}{L \cdot M_2^{(L)}} \right\rfloor + b \right) \bmod \lfloor N_{CCE}^{(K_s)}/L \rfloor \right\} + j, \quad \text{Equation 7}$$

In Equation 7, $m_2=0, 1, \ldots, M_2^{(L)}-1$, and $j=0, 1, \ldots, L-1$. $N_{CCE}^{(K_s)}$, $L$, and $M_2^{(L)}$ denote the number of total CCEs in a sub-cluster of size $K_s$, a CCE aggregation level, and the number of B-PDCCH candidates per sub-cluster.

TABLE 2

Example B-PDCCH candidates monitored by a UE, when $N_{GI} = 26$ ($K_z = 16$)

| | Search space $S^{(L)}$ | | | | | |
|---|---|---|---|---|---|---|
| Type | Sub-cluster size in SEs per symbol block ($K_s$) | Sub-cluster size in CCEs ($N_{CCE}^{(K_s)}$) | CCE aggre-gation level L | Number of sub-cluster candidates $M_1^{(L)}$ | Number of B-PDCCH candidates per sub-cluster $M_2^{(L)}$ | Total number of B-PDCCH candidates $M^{(L)}$ |
| UE-spe-cific | 72 | 2 · $N_{ctrl}$ | 2 | 8 | 1 | 8 |
| | 144 | 4 · $N_{ctrl}$ | 4 | 6 | 1 | 6 |
| | 288 | 8 · $N_{ctrl}$ | 8 | 2 | 1 | 2 |
| | 576 | 16 · $N_{ctrl}$ | 16 | 2 | 1 | 2 |

TABLE 3

Example B-PDCCH candidates monitored by a UE, when $N_{GI} = 50$ ($K_z = 30$)

| | Search space $S^{(L)}$ | | | | | |
|---|---|---|---|---|---|---|
| Type | Sub-cluster size in SEs per symbol block ($K_s$) | Sub-cluster size in CCEs ($N_{CCE}^{(K_s)}$) | CCE aggre-gation level L | Number of sub-cluster candidates $M_1^{(L)}$ | Number of B-PDCCH candidates per sub-cluster $M_2^{(L)}$ | Total number of B-PDCCH candidates $M^{(L)}$ |
| UE-spe-cific | 144 | 4 · $N_{ctrl}$ | 2 | 4 | 2 | 8 |
| | | | 4 | 6 | 1 | 6 |
| | 288 | 8 · $N_{ctrl}$ | 8 | 2 | 1 | 2 |
| | 576 | 16 · $N_{ctrl}$ | 16 | 2 | 1 | 2 |

TABLE 4

Example B-PDCCH candidates monitored by a UE, when $N_{GI} = 106$ ($K_z = 63$)

| | Search space $S^{(L)}$ | | | | | |
|---|---|---|---|---|---|---|
| Type | Sub-cluster size in SEs per symbol block ($K_s$) | Sub-cluster size in CCEs ($N_{CCE}^{(K_s)}$) | CCE aggre-gation level L | Number of sub-cluster candidates $M_1^{(L)}$ | Number of B-PDCCH candidates per sub-cluster $M_2^{(L)}$ | Total number of B-PDCCH candidates $M^{(L)}$ |
| UE-spe-cific | 144 (1 DM RS port) | 4 · $N_{ctrl}$ | 2 | 1 | 2 | 2 |
| | 288 | 8 · $N_{ctrl}$ | 2 | 3 | 2 | 6 |
| | | | 4 | 3 | 2 | 6 |
| | | | 8 | 2 | 1 | 2 |
| | 576 | 16 · $N_{ctrl}$ | 16 | 1 | 2 | 2 |

TABLE 5

Example B-PDCCH candidates monitored by
a UE, when $N_{GI}$ = 158 ($K_s$ = 93)

| | Search space $S^{(L)}$ | | | | | |
|---|---|---|---|---|---|---|
| Type | Sub-cluster size in SEs per symbol block ($K_s$) | Sub-cluster size in CCEs ($N_{CCE}^{(K_s)}$) | CCE aggregation level L | Number of sub-cluster candidates $M_1^{(L)}$ | Number of B-PDCCH candidates per sub-cluster $M_2^{(L)}$ | Total number of B-PDCCH candidates $M^{(L)}$ |
| UE-specific | 288 (1 DM RS port) | 8 · $N_{ctrl}$ | 2 | 1 | 2 | 2 |
| | | | 4 | 1 | 2 | 2 |
| | | | 8 | 1 | 1 | 1 |
| | 576 (3 DM RS ports) | 16 · $N_{ctrl}$ | 2 | 1 | 6 | 6 |
| | | | 4 | 1 | 4 | 4 |
| | | | 8 | 1 | 1 | 1 |
| | | | 16 | 1 | 2 | 2 |

Transmission Mode 2 (TM2) will be discussed below in conjunction with FIG. 6. In TM2, there is also only one control cluster, i.e. one DFT-spreading window, in the DL control region.

Figure 6:
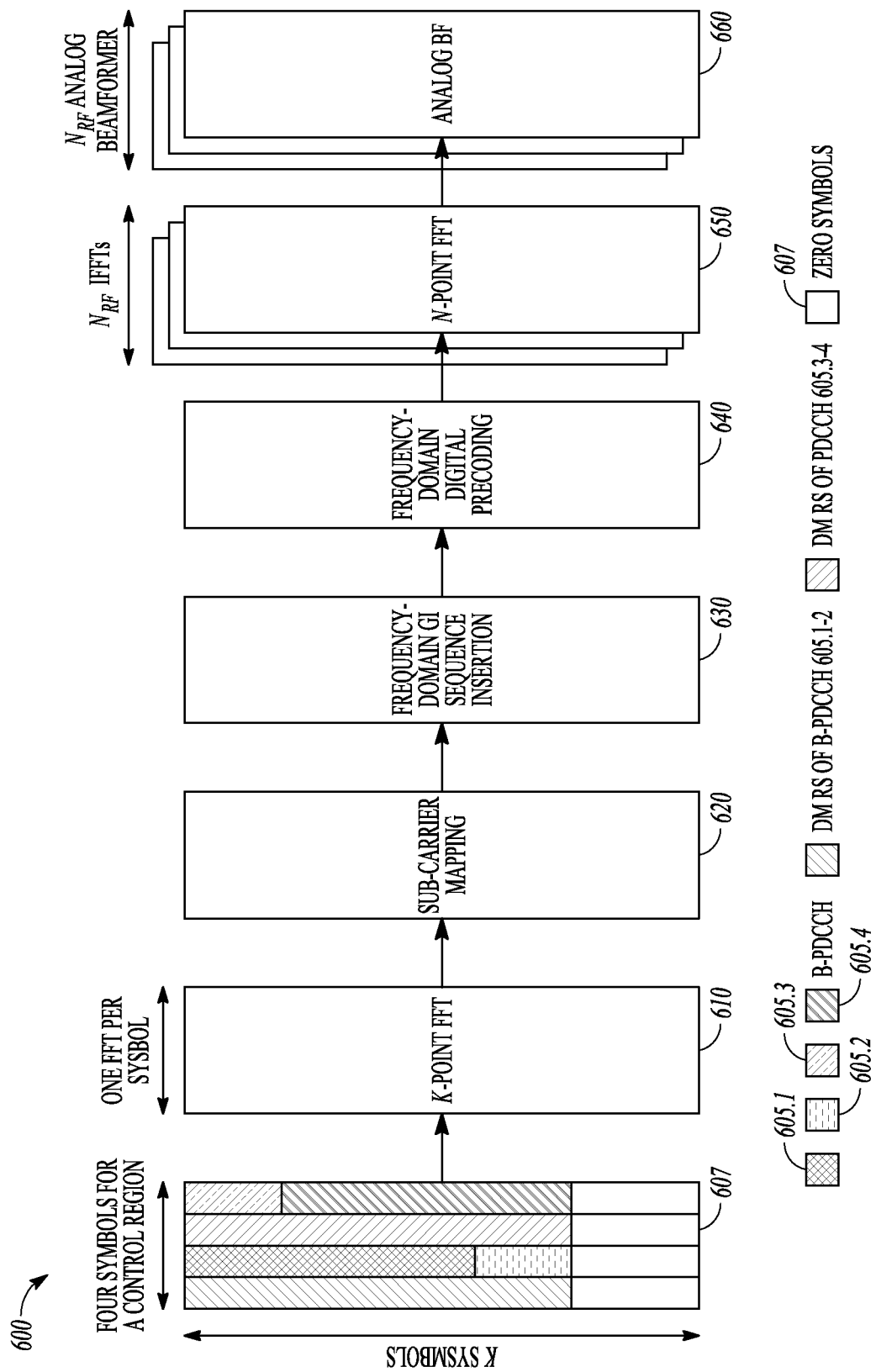
FIG. 6 illustrates time-domain multiplexing of multiple demodulation reference signals within one cluster in accordance with some embodiments.

FIG. 6 illustrates time-domain multiplexing 600 of multiple demodulation reference signals (DM RS) within one cluster for TM2. As illustrated in FIG. 6, multiple B-PDCCHs 605.1-4 undergo K-point FFT 610, sub-carrier mapping 620, frequency-domain GI sequence insertion 630, frequency-domain digital precoding, N-point IFFT, and analog BF 660. The DM RS of B-PDCCH 605.1-2 and the DM RS of B-PDDCCH 605.3-4 are also illustrated, as are zero symbols 607. FIG. 6 includes one DM RS block per symbol block with one cluster.

FIG. 6 illustrates how multiple B-PDCCHs and corresponding DM RS ports are multiplexed within the control cluster in TM2. One beamformed DM RS port occupies an entire symbol block to enhance the channel estimation performance, and an adjacent symbol block is used for B-PDCCH transmission. B-PDCCHs multiplexed in one symbol block employ the same beamforming weights, and a K×1 DM RS vector $x^P = [x_{seq}[0], x_{seq}[1], \ldots, x_{seq}[N_{seq}-1], 0, \ldots 0]^T$ is shared by the multiple B-PDCCHs within the symbol block. Multiple pairs of DM RS and B-PDCCH symbol blocks, each pair associated with one Tx beam, can be configured in the DL control region.

According to some embodiments, a B-PDCCH candidate in a blind decoding search space for TM2 is determined by a symbol block and CCEs within the symbol block, and Table 6 presents example B-PDCCH candidates monitored by a UE. Assuming that every other symbol blocks in the DL control region are used for B-PDCCH transmission (remaining symbol blocks are used for DM RS transmission), a symbol block index corresponding to the symbol block candidate $m_1$ is given by Equation 8.

$$2 \cdot \left\{ (Y_k + b + m_1) \bmod \left\lfloor \frac{N_{ctrl}}{2} \right\rfloor \right\} + i, \quad \text{Equation 8}$$

In Equation 8, $m_1$=0, 1, ... $M_1^{(L)}$-1, $M_1^{(L)}$ the number of symbol block candidates, i=0 for DM RS, and i=1 for corresponding B-PDCCH. The CCEs corresponding to the candidate B-PDCCH $m_2$ within a B-PDCCH symbol block are given by Equation 9.

$$L\left\{ \left( Y_k + \left\lfloor \frac{N_{CCE} \cdot m_2}{L \cdot M_2^{(L)}} \right\rfloor + b \right) \bmod \lfloor N_{CCE}/L \rfloor \right\} + j, \quad \text{Equation 9}$$

In Equation 9, $m_2$=0, 1, ..., $M_2^{(L)}$-1, and j=0, 1, ..., L-1. $N_{CCE}$, L, $M_2^{(L)}$ denote the number of total CCEs in a symbol block, a CCE aggregation level, and the number of B-PDCCH candidates per symbol block.

TABLE 6

Example B-PDCCH candidates monitored by a UE, for all $N_{GI}$ values

| | Search space $S^{(L)}$ | | | | |
|---|---|---|---|---|---|
| Type | Number of CCEs in a symbol block, $N_{CCE}$ | CCE aggregation level L | Number of symbol block candidates $M_1^{(L)}$ | Number of B-PDCCH candidates per symbol block $M_2^{(L)}$ | Total number of B-PDCCH candidates $M^{(L)}$ |
| UE-specific | $N_{CCE} = \left\lfloor \frac{K'}{36} \right\rfloor$, | 2 | 2 | 4 | 8 |
| | | 4 | 2 | 3 | 6 |
| | | 8 | 2 | 1 | 2 |
| | $K' = K - \left\lceil \frac{N_{GI}}{N} \cdot K \right\rceil$ | 16 | 2 | 1 | 2 |

Transmission Mode 3 (TM3) will be discussed below in conjunction with FIGS. 7-8.

Figure 7:
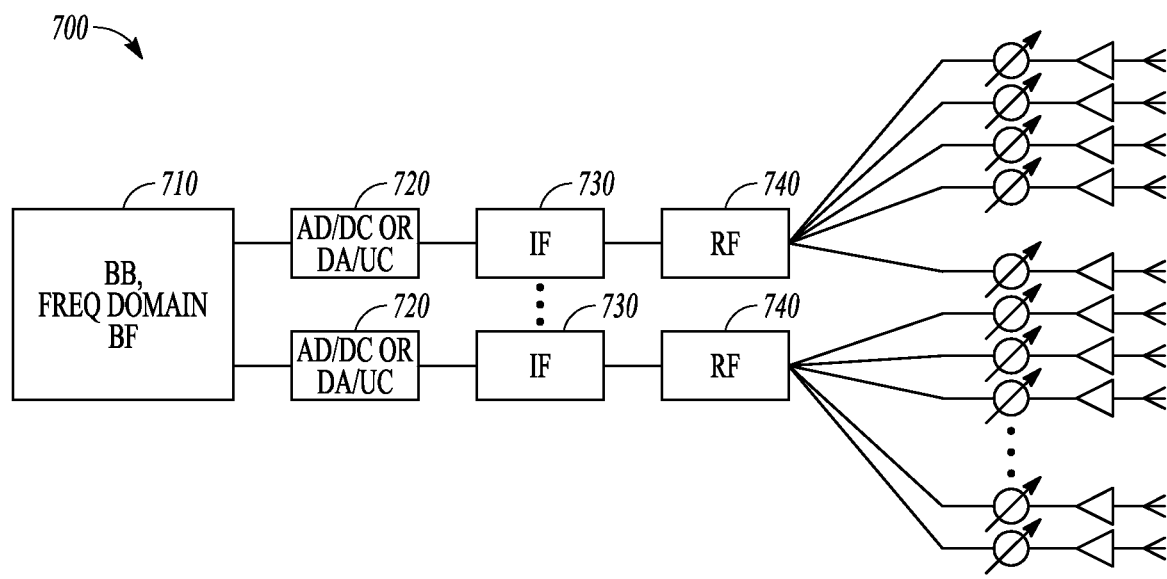
FIG. 7 illustrates an example sub-array based hybrid beamforming architecture with limited flexibility in accordance with some embodiments.

FIG. 7 illustrates an example sub-array based hybrid beamforming architecture 700 with limited flexibility. As shown the beamforming architecture 700 includes a baseband (BB) block 710 with frequency domain beamforming (BE). The BB block 710 communicates with the analog-to-digital/down conversion (AD/DC) or digital-to-analog/up conversion (DA/UC) blocks 720, which communicate with the intermediate frequency (IF) blocks 730, which communicate with the radio frequency (RE) blocks 740. For a transmitter, the RF blocks 740 generate output from the beamforming architecture 700. In some cases, the beamforming architecture can be implemented without the IF blocks 730.

Figure 8:
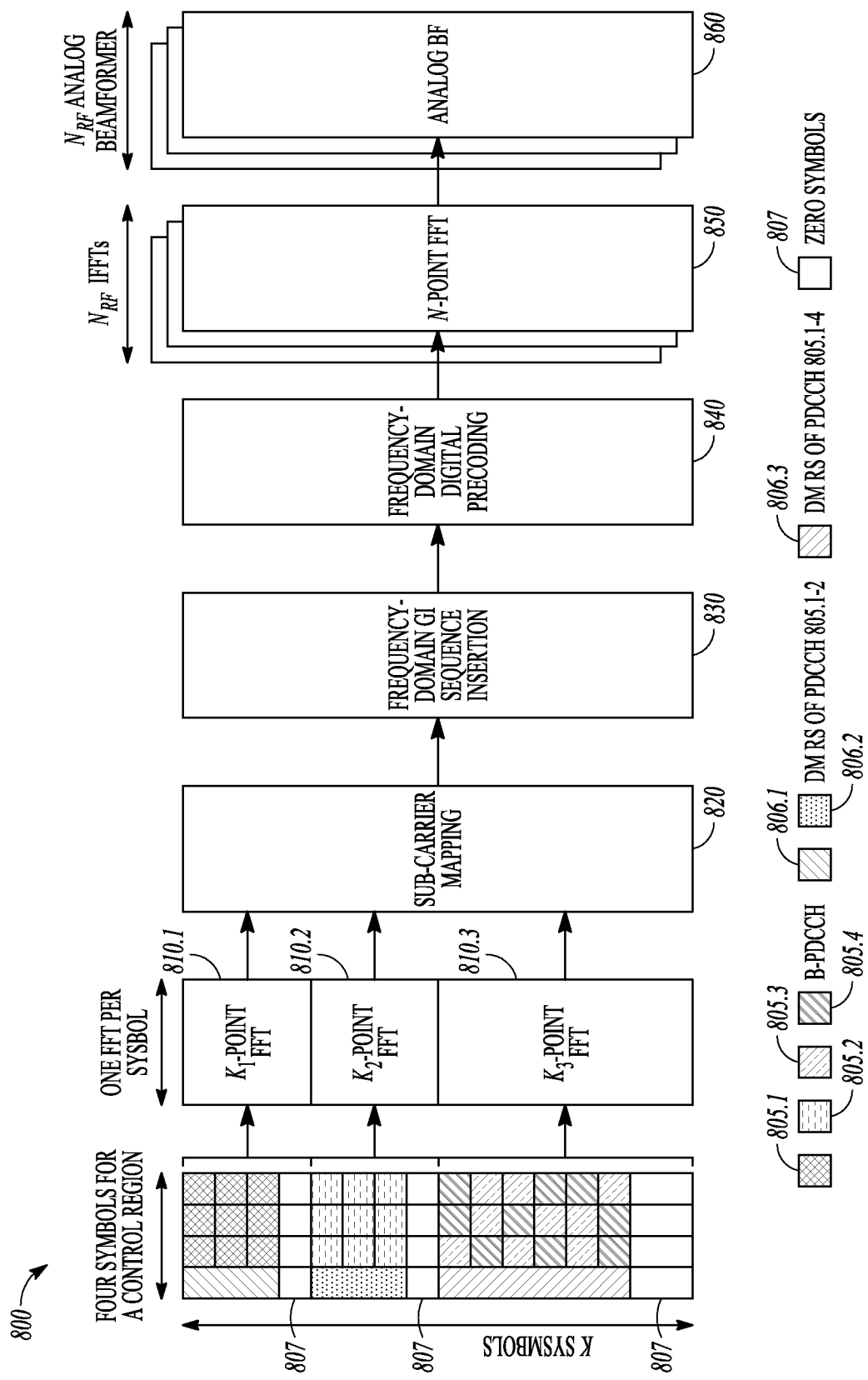
FIG. 8 illustrates frequency-domain multiplexing of multiple demodulation reference signal ports with multiple control clusters in accordance with some embodiments.

FIG. 8 illustrates frequency-domain multiplexing 800 of multiple demodulation reference signal (DM RS) ports with multiple control clusters. As shown in FIG. 8, a K1-point FFT is applied to B-PDCCH 805.1 at 810.1. A K2-point FFT is applied to B-PDCCH 805.2 at 810.2. A K3-point FFT is applied to B-PDCCHs 805.3-4 at 810.3. Sub-carrier mapping 820, frequency-domain GI sequence insertion 830, frequency domain digital precoding 840, N-point IFFT 850, and analog BF 860 are applied to the B-PDCCHs 805.1-4. DM RS 806.1 of B-PDCCH 805.1, DM RS 806.2 of B-PDCCH 805.2, and DMRS 806.3 of B-PDCCHs 805.3-4 are also illustrated, as are zero symbols 807.

In TM3, multiple control clusters, that is, multiple DFT spreading windows, are employed in the DL control region, and each control cluster is mapped to a distinctive set of subcarriers, as illustrated in FIG. 8. One or more B-PDCCHs within each control cluster are beamformed with the same Tx beamforming weights. Assuming that B-PDCCH 1 is intended to UE1, the received data on subcarrier k at UE1's receiver is given by Equation 10.

$$Y(k) = H_1(k) \cdot P(k) \cdot \sum_{u=1}^{U_i} X_u(k) + H_1(k) \cdot P(k) \cdot X_{GI}(k) + V(k),$$
Equation 10

In Equation 10, $U_i$ is the number of B-PDCCHs multiplexed in the control cluster i, and $X_u(k)$ is an output of $K_i$-point EFT of $K_i \times 1$ data symbol vector $x_u$, which is mapped into subcarrier k, where $K_i < K$. With 1 DM RS port per control cluster, the received DM RS on subcarrier k at UE1's receiver is given by Equation 11.

$$Y(k) = H_1(k) \cdot P(k) \cdot (X^{P,i}(k) + X_{GI}(k)) + V(k),$$
Equation 11

In Equation 11, $X^{P,i}(k)$ is a DFT-spread DM RS mapped to subcarrier k for the control cluster i. Note that $K_i \times 1$ DM RS vector $x^{P,i} = [x_{seq}^i[0], x_{seq}^i[1], \ldots, x_{seq}^i[N_{seq}^i-1], 0, \ldots, 0]^T$ is shared by the multiple B-PDCCHs in the control cluster i. This transmission structure is suitable when B-PDCCHs are transmitted from multiple APs and/or from an AP with multiple sub-array based hybrid beamforming architecture shown in FIG. 7.

According to some embodiments, a B-PDCCH candidate in a blind decoding search space for TM3 is determined by a control cluster and CCEs within the control cluster, and Table 7 presents example B-PDCCH candidates monitored by a UE. For a given symbol block of the DL control region, the SEs corresponding to the candidate control cluster $m_1$ are given by Equation 12.

$$K_i \left\{ \left( \left\lfloor \frac{K \cdot m_1}{K_i \cdot M_1^{(L)}} \right\rfloor + (Y_k + b) \mod \left\lfloor \frac{K}{K_i \cdot M_1^{(L)}} \right\rfloor \right) \mod \lfloor K/K_i \rfloor \right\} + s,$$
Equation 12

In Equation 12, $m_1 = 0, 1, \ldots, M_1^{(L)}-1$, and $s=0, 1, \ldots, K'_i-1$. $K'_i$, $K_i$, and $M_1^{(L)}$ denote the number of non-zero symbols per symbol bock in the control cluster, the control cluster size in SEs per symbol block, and the number of control cluster candidates. The CCEs corresponding to the candidate B-PDCCH $m_2$ within a control cluster are given by Equation 13.

$$L \left\{ \left( Y_k + \left\lfloor \frac{N_{CCE}^{(K_i)} \cdot m_2}{L \cdot M_2^{(L)}} \right\rfloor + b \right) \mod \lfloor N_{CCE}^{(K_i)}/L \rfloor \right\} + j,$$
Equation 13

In Equation 13, $m_2 = 0, 1, \ldots, M_2^{(L)}-1$, and $j=0, 1, \ldots, L-1$. $N_{CCE}^{(K_i)}$, L, and $M_2^{(L)}$ denote the total number of CCEs in a control cluster of size $K_i$, a CCE aggregation level, and the number of B-PDCCH candidates per control cluster.

TABLE 6

| | | B-PDCCH candidates monitored by a UE, for all $N_{GI}$ values | | | | |
|---|---|---|---|---|---|---|
| | | Search space $S^{(L)}$ | | | Number of B-PDCCH candidates per control cluster $M_2^{(L)}$ | |
| Type | Cluster size in SEs per symbol block ($K_i$) | Cluster size in CCEs ($N_{CCE}^{(K_i)}$) | CCE aggregation level L | Number of control cluster candidates $M_1^{(L)}$ | | Total number of B-PDCCH candidates $M^{(L)}$ |
| UE-specific | 144 288 | $N_{CCE}^{(K_i)} = \left\lfloor \frac{K'_i \cdot N_{ctrl}}{36} \right\rfloor$ | 2 4 8 | 4 3 2 | 2 2 1 | 8 6 2 |
| | 576 | $K'_i = K_i - \left\lceil \frac{N_{GI}}{N} \cdot K_i \right\rceil$ | 16 | 2 | 1 | 2 |

Figure 9:
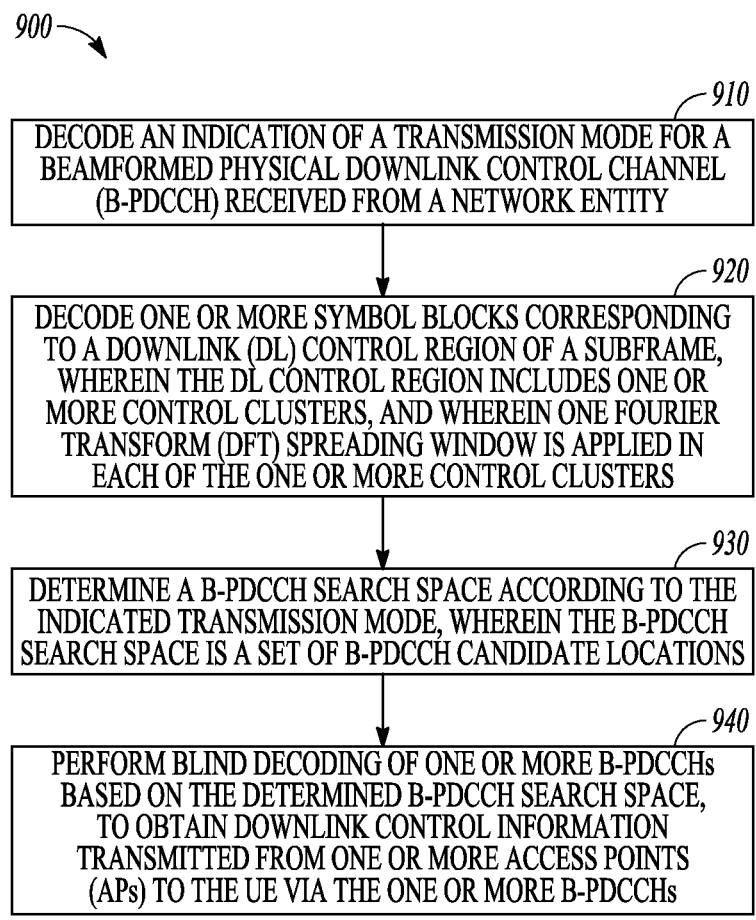
FIG. 9 is a flow chart illustrating an example process for obtaining downlink control information in accordance with some embodiments.

FIG. 9 is a flow chart illustrating an example process 900 for obtaining downlink control information. The process 900 may be implemented at a user equipment (UE), for example, the UE 1002 described in conjunction with FIG. 10.

Figure 10:
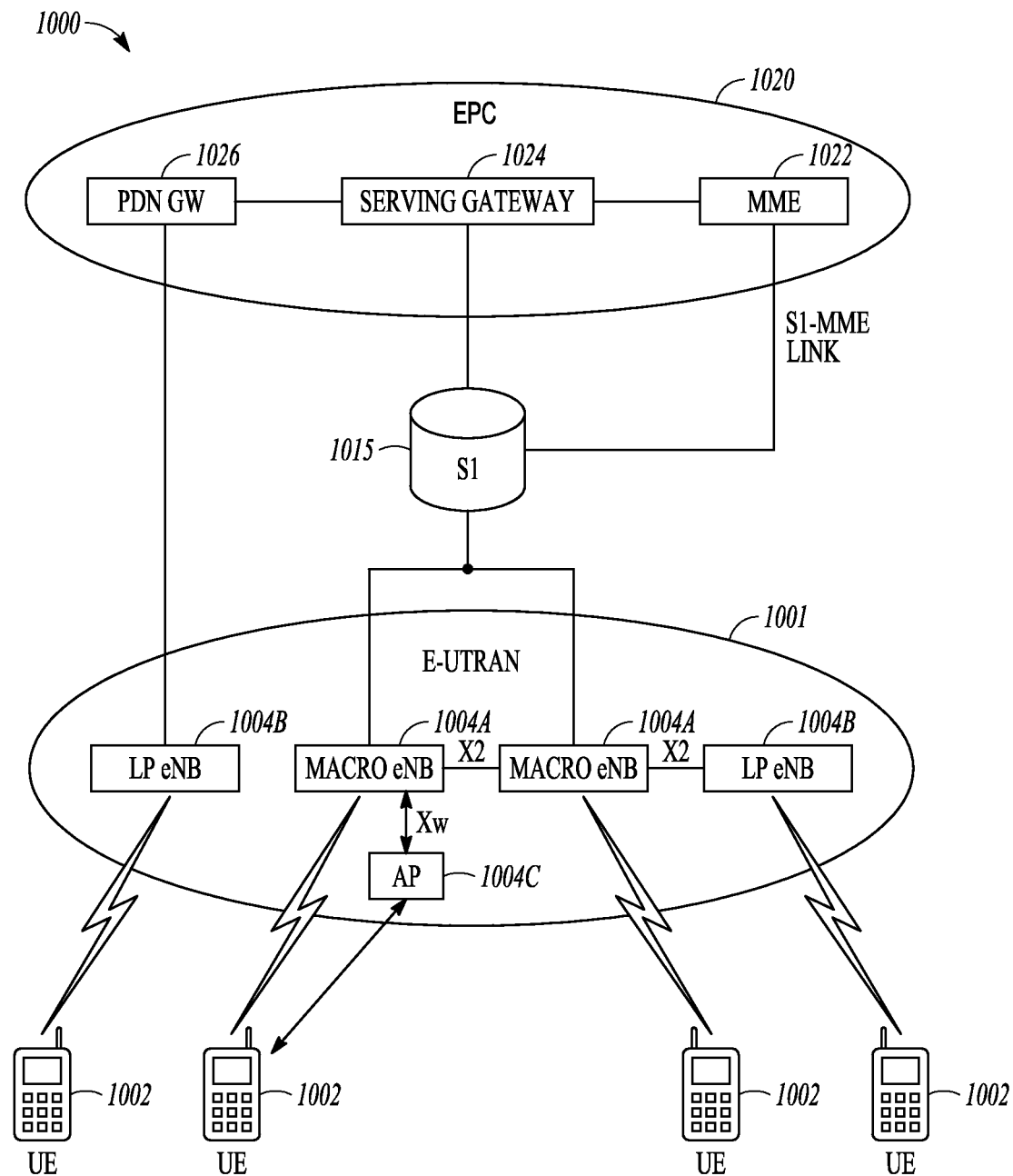
FIG. 10 is a functional diagram of a wireless network in accordance with some embodiments.

The process 900 begins at operation 910, where the UE decodes an indication of a transmission mode for a beamformed physical downlink control channel (B-PDCCH) received from a network entity (e.g., the eNB 1004A/1004B or the AP 1004C of FIG. 10).

At operation 920, the UE decodes one or more symbol blocks corresponding to a downlink (DL) control region of a subframe, wherein the DL control region includes one or more control clusters, and wherein one discrete Fourier transform (DFT) spreading window is applied in each of the one or more control clusters.

At operation 930, the UE determines a B-PDCCH search space according to the indicated transmission mode, wherein the B-PDCCH search space is a set of B-PDCCH candidate locations.

At operation 940, the UE performs blind decoding of one or more B-PDCCHs based on the determined B-PDCCH search space, to obtain downlink control information transmitted from one or more access points (APs) to the UE via the one or more B-PDCCHs. After operation 940, the process 900 ends.

FIG. 10 shows an example of a portion of an end-to-end network architecture of a Long Term Evolution (LTE)

network 1000 with various components of the network in accordance with some embodiments. As used herein, an LTE network refers to both LTE and LTE Advanced (LTE-A) networks as well as other versions of LTE networks to be developed. The network 1000 may comprise a radio access network (RAN) (e.g., as depicted, the E-UTRAN or evolved universal terrestrial radio access network) 1001 and core network 1020 (e.g., shown as an evolved packet core (EPC)) coupled together through an S1 interface 1015. For convenience and brevity, only a portion of the core network 1020, as well as the RAN 1001, is shown in the example. The network 1000 includes the UE 1002, which is configured to implement the process 900 described in conjunction with FIG. 9.

The core network 1020 may include a mobility management entity (MME) 1022, serving gateway (serving GW) 1024, and packet data network gateway (PDN GW) 1026. The RAN 1001 may include evolved node Bs (eNBs) 1004 (which may operate as base stations) for communicating with user equipment (UE) 1002. The eNBs 1004 may include macro eNBs 1004a and low power (LP) eNBs 1004b. The eNBs 1004 may correspond to the network entity described in conjunction with FIG. 9.

The MME 1022 may be similar in function to the control plane of legacy Serving GPRS Support Nodes (SGSN). The MME 1022 may manage mobility aspects in access such as gateway selection and tracking area list management. The serving GW 1024 may terminate the interface toward the RAN 1001, and route data packets between the RAN 1001 and the core network 1020. In addition, the serving GW 1024 may be a local mobility anchor point for inter-eNB handovers and also may provide an anchor for inter-3GPP mobility. Other responsibilities may include lawful intercept, charging, and some policy enforcement. The serving GW 1024 and the MME 1022 may be implemented in one physical node or separate physical nodes.

The PDN GW 1026 may terminate a SGi interface toward the packet data network (PDN). The PDN GW 1026 may route data packets between the EPC 1020 and the external PDN, and may perform policy enforcement and charging data collection. The PDN GW 1026 may also provide an anchor point for mobility devices with non-LTE access. The external PDN can be any kind of IP network, as well as an IP Multimedia Subsystem (IMS) domain. The PDN GW 1026 and the serving GW 1024 may be implemented in a single physical node or separate physical nodes.

The eNBs 1004 (macro and micro) may terminate the air interface protocol and may be the first point of contact for a UE 1002. In some embodiments, an eNB 1004 may fulfill various logical functions for the RAN 1001 including, but not limited to, RNC (radio network controller functions) such as radio bearer management, uplink and downlink dynamic radio resource management and data packet scheduling, and mobility management. In accordance with embodiments, UEs 1002 may be configured to communicate orthogonal frequency division multiplexed (OFDM) communication signals with an eNB 1004 over a multicarrier communication channel in accordance with an OFDMA communication technique. The OFDM signals may comprise a plurality of orthogonal subcarriers.

The S1 interface 1015 may be the interface that separates the RAN 1001 and the EPC 1020. It may be split into two parts: the S1-U, which may carry traffic data between the eNBs 1004 and the serving GW 1024, and the S1-MME, which may be a signaling interface between the eNBs 1004 and the MME 1022. The X2 interface may be the interface between eNBs 1004. The X2 interface may comprise two parts, the X2-C and X2-U. The X2-C may be the control plane interface between the eNBs 1004, while the X2-U may be the user plane interface between the eNBs 1004.

With cellular networks, LP cells 1004b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 1004b might be a femtocell eNB since it is coupled through the PDN GW 1026. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 1004a via an X2 interface. Picocell eNBs or other LP eNBs LP eNB 1004b may incorporate some or all functionality of a macro eNB LP eNB 1004a. In some cases, this may be referred to as an access point base station or enterprise femtocell.

In some embodiments, the UE 1002 may communicate with an access point (AP) 1004c. The AP 1004c may use only the unlicensed spectrum (e.g., WiFi bands) to communicate with the UE 1002. The AP 1004c may communicate with the macro eNB 1004A (or LP eNB 1004B) through an Xw interface. In some embodiments, the AP 1004c may communicate with the UE 1002 independent of communication between the UE 1002 and the macro eNB 1004A. In other embodiments, the AP 1004c may be controlled by the macro eNB 1004A and use LWA, as described in more detail below.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band may differ from those in another frequency band. Each slot of the subframe may contain 6-7 OFDM symbols, depending on the system used. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and I slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid in the time domain corresponds to one subframe or two resource blocks. Each resource grid may comprise 12 (subcarriers) *14 (symbols)=168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDCCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 11:
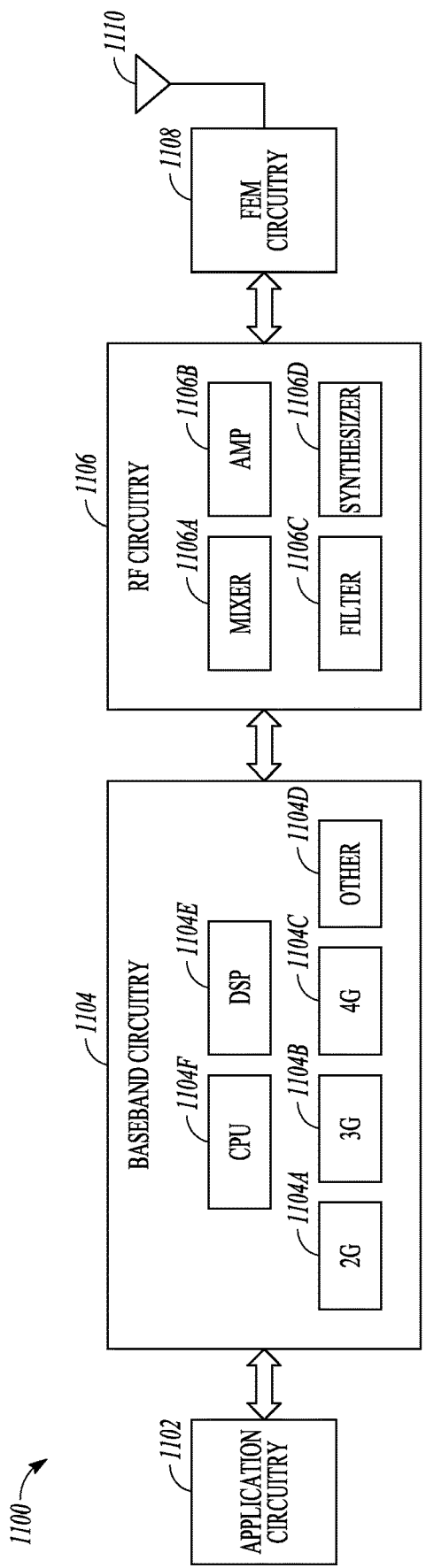
FIG. 11 illustrates components of a communication device in accordance with some embodiments.

Embodiments described herein may be implemented into a system using any suitably configured hardware and/or software. FIG. 11 illustrates components of a UE in accordance with some embodiments. At least some of the components shown may be used in an eNB or MME, for example, such as the UE 1002 or eNB 1004 shown in FIG. 10. The UE 1100 and other components may be configured to use the synchronization signals as described herein. The UE 1100 may be a stationary, non-mobile device or may be a mobile device. In some embodiments, the UE 1100 may include application circuitry 1102, baseband circuitry 1104, Radio Frequency (RF) circuitry 1106, front-end module (FEM) circuitry 1108 and one or more antennas 1110, coupled together at least as shown. At least some of the baseband circuitry 1104, RF circuitry 1106, and FEM circuitry 1108 may form a transceiver. In some embodiments, other network elements, such as the eNB may contain some or all of the components shown in FIG. 11. Other of the network elements, such as the MME, may contain an interface, such as the S1 interface, to communicate with the eNB over a wired connection regarding the UE.

The application or processing circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) base-band processor 1104*a*, third generation (3G) baseband processor 1104*b*, fourth generation (4G) baseband processor 1104*c*, and/or other baseband processor(s) 1104*d* for other existing generations, generations in development or to be developed in the future (e.g., fifth generation (5G), 6G, etc.). The baseband circuitry 1104 (e.g., one or more of baseband processors 1104*a-d*) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include FFT, precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 1104*e* of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104*f*. The audio DSP(s) 1104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (Wifi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 1106 may enable communication with wireless networks using modulated electromagnetic radiation through a non-solid medium. In various embodiments, the RE circuitry 1106 may include switches, filters, amplifiers, etc, to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RE circuitry 1106 may include mixer circuitry 1106*a*, amplifier circuitry 1106*b* and filter circuitry 1106*c*. The transmit signal path of the RF circuitry 1106 may include filter circuitry 1106*c* and mixer circuitry 1106*a*. RE circuitry 1106 may also include synthesizer circuitry 1106*d* for synthesizing a frequency for use by the mixer circuitry 1106*a* of the receive signal path and the transmit signal path. In some embodiments, the mixer circuitry 1106*a* of the receive signal path may be configured to down-convert RE signals received from the FEM circuitry 1108 based on the synthesized frequency provided by synthesizer circuitry 1106*d*. The amplifier circuitry 1106*b* may be configured to amplify the down-converted signals and the filter circuitry 1106*c* may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*. The filter circuitry 1106*c* may include a low-pass filter (LPF), although the scope of the embodiments is not limited in this respect.

In some embodiments, the mixer circuitry 1106*a* of the receive signal path and the mixer circuitry 1106*a* of the transmit signal path may include two or more mixers and may be arranged for quadrature downconversion and/or upconversion respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* may be arranged for direct downconversion and/or direct upconversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106*d* may be a fractional-N synthesizer or a fractional N/N+1 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE 1100 may include additional elements such as, for example, memory/storage, display, camera, sensor, and/or input/output (I/O) interface as described in more detail below. In some embodiments, the UE 1100 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc), or other device that may receive and/or transmit information wirelessly. In some embodiments, the UE 1100 may include one or more user interfaces designed to enable user interaction with the system and/or peripheral component interfaces designed to enable peripheral component interaction with the system. For example, the UE 1100 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 1110 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1110 may be effectively separated to take advantage of spatial diversity and the different channel characteristics that may result.

Although the UE 1100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 12:
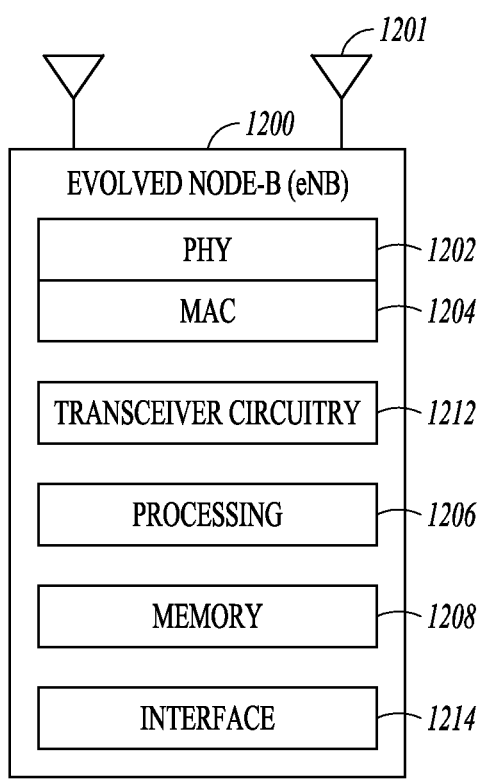
FIG. 12 illustrates a block diagram of a communication device in accordance with some embodiments.

FIG. 12 is a block diagram of a communication device 1200 in accordance with some embodiments. The communication device 1200 may be a UE or eNB, for example, such as the UE 1002 or eNB 1004 shown in FIG. 10. The physical layer circuitry 1202 may perform various encoding and decoding functions that may include formation of baseband signals for transmission and decoding of received signals. The communication device 1200 may also include medium access control layer (MAC) circuitry 1204 for controlling access to the wireless medium. The communication device 1200 may also include processing circuitry 1206, such as one or more single-core or multi-core processors, and memory 1208 arranged to perform the operations described herein. The physical layer circuitry 1202, MAC circuitry 1204 and processing circuitry 1206 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a SPAN. In some embodiments, the communication device 1200 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 1200 may include transceiver circuitry 1212 to enable communication with other external devices wirelessly and interfaces 1214 to enable wired communication with other external devices. As another example, the transceiver circuitry 1212 may perform various transmission and reception functions such as conversion of signals between a baseband range and a Radio Frequency (RF) range.

The antennas 1201 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 1201 may be effectively separated to take advantage of spatial diversity and the different channel characteristics that may result.

Although the communication device 1200 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 13:
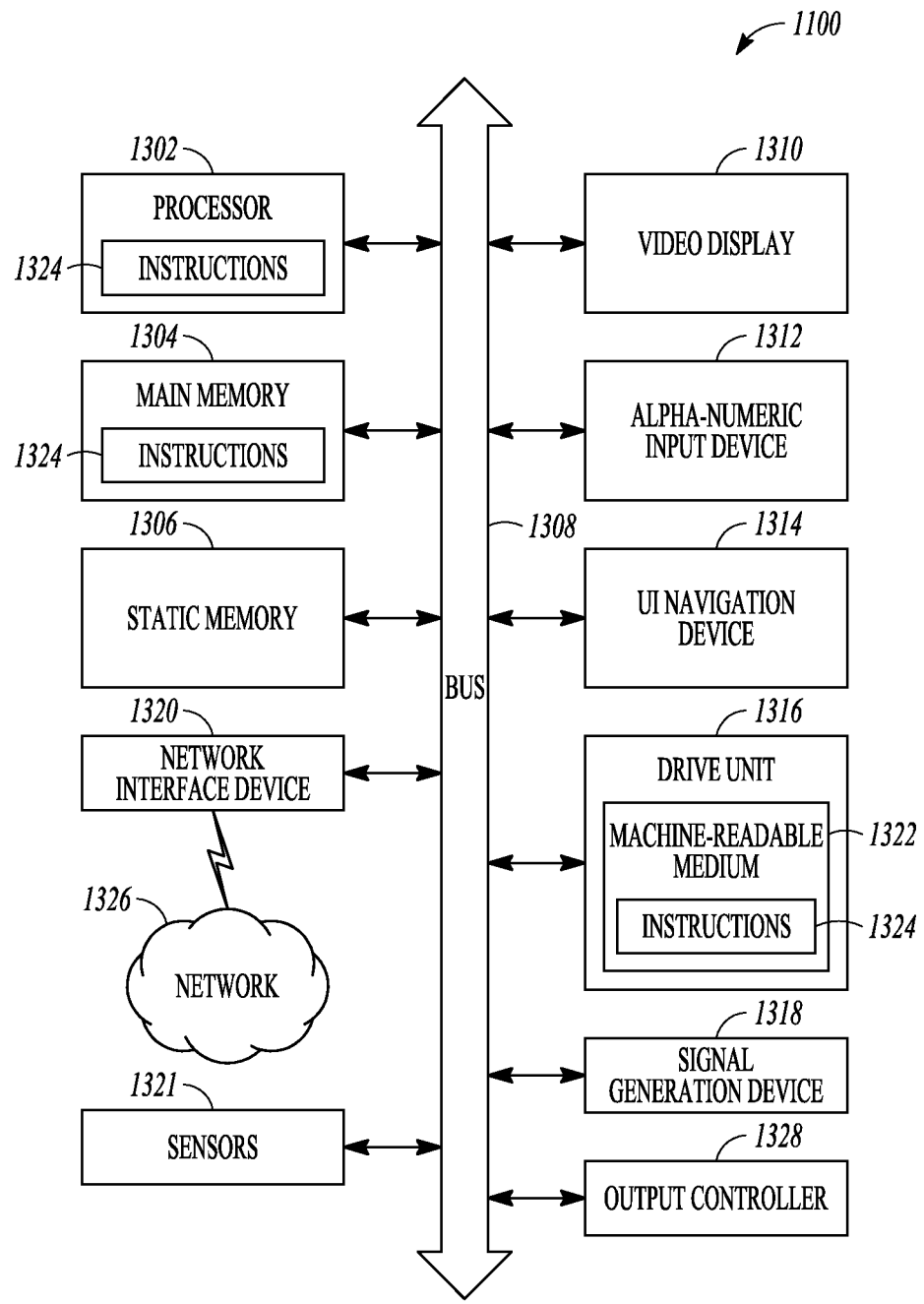
FIG. 13 illustrates another block diagram of a communication device in accordance with some embodiments.

FIG. 13 illustrates another block diagram of a communication device 1300 in accordance with some embodiments. The communication device 1300 may correspond to the UE 1002 or the eNB 1004. In alternative embodiments, the communication device 1300 may operate as a standalone device or may be connected (e.g., networked) to other communication devices. In a networked deployment, the communication device 1300 may operate in the capacity of a server communication device, a client communication device, or both in server-client network environments. In an example, the communication device 1300 may act as a peer communication device in peer-to-peer (P2P) (or other distributed) network environment. The communication device 1300 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The communication device 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The communication device 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The communication device 1300 may include an output controller 1328, such as a serial (e.g., universal serial bus (USB), parallel, or other wired or wireless e.g., infrared (IR), near field communication (NFC), etc.) connection to communicate or control one or more peripheral devices (e.g., a printer, card reader, etc.).

The storage device 1316 may include a communication device readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the communication device 1300. In an example, one or any combination of the hardware processor 1302, the main memory 1304, the static memory 1306, or the storage device 1316 may constitute communication device readable media.

While the communication device readable medium 1322 is illustrated as a single medium, the term "communication device readable medium" may include a single medium or multiple media (e.g., a centralized or distributed database, and/or associated caches and servers) configured to store the one or more instructions 1324.

The term "communication device readable medium" may include any medium that is capable of storing, encoding, or carrying instructions for execution by the communication device 1300 and that cause the communication device 1300 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media. may include non-transitory communication device readable media. In some examples, communication device readable media may include communication device readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), AMMO, or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the communication device 1300, and includes digital or analog communications signals or other intangible medium to facilitate communication of such software.

The subject technology is described below in conjunction with various examples.

Example 1 is an apparatus of a user equipment (UE), the apparatus comprising: processing circuitry and memory, the processing circuitry to: decode an indication of a transmission mode for a beamformed physical downlink control channel (B-PDCCH) received from a network entity; decode one or more symbol blocks corresponding to a downlink (DL) control region of a subframe, wherein the DL control region includes one or more control clusters, and wherein one discrete Fourier transform (DFT) spreading window is applied in each of the one or more control clusters; determine a B-PDCCH search space according to the indicated transmission mode, wherein the B-PDCCH search space is a set of B-PDCCH candidate locations; and perform blind decoding of one or more B-PDCCHs based on the determined B-PDCCH search space, to obtain downlink control information transmitted from one or more access points (APs) to the UE via the one or more B-PDCCHs.

In Example 2, the subject matter of Example 1 optionally includes that the processing circuitry is further to decode an indication of a cyclic prefix (CP), zero tail (ZT), or guard interval (GI) length received from the network entity.

In Example 3, the subject matter of Example 2 optionally includes that the processing circuitry is further to determine the B-PDCCH search space based on the indicated CP, ZT, or GI length.

In Example 4, the subject matter of any of Examples 1-2 optionally includes that the transmission mode for the beamformed B-PDCCH is determined according to a beamforming architecture at the one or more APs.

In Example 5, the subject matter of any of Examples 1-2 optionally includes that the transmission mode for the beamformed B-PDCCH includes only one control cluster in the DL control region.

In Example 6, the subject matter of Example 5 optionally includes that the processing circuitry is further to select the transmission mode including the only one control cluster when the one or more B-PDCCHs are transmitted from one AP with a fully connected hybrid beamforming architecture.

In Example 7, the subject matter of Example 5 optionally includes that the only one control cluster in the DL control region includes one or more sub-clusters, wherein each of the one or more sub-clusters includes one or more demodulation reference signal (DM RS) ports and B-PDCCHs, and wherein the one or more DM RS ports and the B-PDCCHs are spatially separated.

In Example 8, the subject matter of Example 7 optionally includes that the processing circuitry is further to place the DM RS sequences for the spatially separated DM RS ports adjacently within a DM RS symbol block of each of the one or more sub-clusters.

In Example 9, the subject matter of Examples 8 optionally includes that the processing circuitry is further to extract time-domain samples of the DM RS symbol block corresponding to a target sub-cluster and a neighborhood of the target sub-cluster; and insert zeroes for other sample positions before performing frequency-domain channel estimation.

In Example 10, the subject matter of Example 7 optionally includes that the processing circuitry is further to determine sub-cluster sizes for the one or more sub-clusters based on at least one of the channel delay spread statistics and the CP, ZT, or GI length.

In Example 11, the subject matter of Example 5 optionally includes that the only one control cluster in the DL control region includes one or more pairs of symbol blocks, wherein each of the one or more pairs of symbol blocks includes a symbol block for one DM RS port and a symbol block for one or more B-PDCCHs, and wherein the DM RS port and the one or more B-PDCCHs in the pair of symbol blocks are associated with same transit beamforming weights.

In Example 12, the subject matter of any of Examples 1-2 optionally includes that the transmission mode for the B-PDCCH includes multiple control clusters in the DL control region, and wherein the one or more B-PDCCHs are transmitted from more than one AP or from one AP with a sub-array based hybrid beamforming architecture.

In Example 13, the subject matter of any of Examples 1-2 optionally includes that the network entity comprises an evolved NodeB (eNB) or an access point.

In Example 14, the subject matter of any of Examples 1-2 optionally includes transceiver circuitry to: receive, from the network entity, the indication of the transmission mode for the B-PDCCH; and receive the one or more symbol blocks corresponding to the DL control region of the subframe; and an antenna coupled to the transceiver circuitry.

In Example 15, the subject matter of any of Example 1-2 optionally includes that the processing circuitry comprises a baseband processor.

Example 16 is an apparatus of a user equipment (UE), the apparatus comprising: processing circuitry and memory, the processing circuitry to: decode an indication of a transmission mode for a beamformed physical downlink control channel (B-PDCCH) received from a network entity; decode one or more symbol blocks corresponding to a downlink (DL) control region of a subframe, wherein the DL control region includes one or more control clusters, and wherein one discrete Fourier transform (DFT) spreading window is applied in each of the one or more control clusters; decode an indication of a cyclic prefix (CP), zero tail (ZT), or guard interval (GI) length received from the network entity; determine, based on the indicated CP, ZT, or GI length, a B-PDCCH search space according to the indicated transmission mode, wherein the B-PDCCH search space is a set of B-PDCCH candidate locations; and perform blind decoding of one or more B-PDCCHs based on the determined B-PDCCH search space, to obtain downlink control information transmitted from one or more access points (APs) to the UE via the one or more B-PDCCHs.

In Example 17, the subject matter of Example 16 optionally includes that the transmission mode for the beamformed B-PDCCH is determined according to a beamforming architecture at the one or more APs.

In Example 18, the subject matter of Example 16 optionally includes that the transmission mode for the beamformed B-PDCCH includes only one control cluster in the DL control region.

In Example 19, the subject matter of Example 18 optionally includes that the processing circuitry is further to: select the transmission mode including the only one control cluster when the one or more B-PDCCHs are transmitted from one AP with a fully connected hybrid beamforming architecture.

In Example 20, the subject matter of Example 18 optionally includes that the only one control cluster in the DL control region includes one or more sub-clusters, wherein each of the one or more sub-clusters includes one or more demodulation reference signal (DM RS) ports and B-PDCCHs, and wherein the one or more DM RS ports and the B-PDCCHs are spatially separated.

In Example 21, the subject matter of Example 20 optionally includes that the processing circuitry is further to: place the DM RS sequences for the spatially separated DM RS ports adjacently within a DM RS symbol block of each of the one or more sub-clusters.

In Example 22, the subject matter of Example 21 optionally includes that the processing circuitry is further to: extract time-domain samples of the DM RS symbol block corresponding to a target sub-cluster and a neighborhood of the target sub-cluster; and insert zeroes for other sample positions before performing frequency-domain channel estimation.

In Example 23, the subject matter of Example 20 optionally includes that the processing circuitry is further to: determine sub-cluster sizes for the one or more sub-clusters based on at least one of the channel delay spread statistics and the CP, ZT, or GI length.

Example 24 is a machine-readable medium comprising instructions that, when executed by one or more processors of a machine, cause the one or more processors to: decode an indication of a transmission mode for a beamformed physical downlink control channel (B-PDCCH) received from a network entity; decode one or more symbol blocks corresponding to a downlink (DL) control region of a subframe, wherein the DL control region includes one or more control clusters, and wherein one discrete Fourier transform (DFT) spreading window is applied in each of the one or more control clusters; determine a B-PDCCH search space according to the indicated transmission mode, wherein the B-PDCCH search space is a set of B-PDCCH candidate locations; and perform blind decoding of one or more B-PDCCHs based on the determined B-PDCCH search space, to obtain downlink control information transmitted from one or more access points (APs) to the UE via the one or more B-PDCCHs.

Example 25 is an apparatus of a user equipment (UE), the apparatus comprising: means for decoding an indication of a transmission mode for a beamformed physical downlink control channel (B-PDCCH) received from a network entity; means for decoding one or more symbol blocks corresponding to a downlink (DL) control region of a subframe, wherein the DL control region includes one or more control clusters, and wherein one discrete Fourier transform (DFT) spreading window is applied in each of the one or more control clusters; means for determining a B-PDCCH search space according to the indicated transmission mode, wherein the B-PDCCH search space is a set of B-PDCCH candidate locations; and means for performing blind decoding of one or more B-PDCCHs based on the determined B-PDCCH search space, to obtain downlink control information transmitted from one or more access points (APs) to the UE via the one or more B-PDCCHs.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The following claims are hereby incorporated into the detailed description, with each claim standing on its own as a separate embodiment.

What is claimed is:

1. An apparatus of a user equipment (UE), the apparatus comprising:
   processing circuitry and memory, the processing circuitry to:
   decode an indication of a transmission mode for a beamformed physical downlink control channel (B-PDCCH) received from a network entity;
   decode one or more symbol blocks corresponding to a downlink (DL) control region of a subframe, wherein the DL control region includes one or more control clusters, and wherein one discrete Fourier transform (DFT) spreading window is applied in each of the one or more control clusters;
   determine a B-PDCCH search space according to the indicated transmission mode, wherein the B-PDCCH search space is a set of B-PDCCH candidate locations; and
   perform blind decoding of one or more B-PDCCHs based on the determined B-PDCCH search space, to obtain downlink control information transmitted from one or more evolved NodeBs (eNBs) to the UE via the one or more B-PDCCHs.

2. The apparatus of claim 1, wherein the processing circuitry is further to:
   decode an indication of a cyclic prefix (CP), zero tail (ZT), or guard interval (GI) length received from the network entity.

3. The apparatus of claim 2, wherein the processing circuitry is further to:
   determine the B-PDCCH search space based on the indicated CP, ZT, or GI length.

4. The apparatus of claim 1, wherein the transmission mode for the B-PDCCH is determined according to a beamforming architecture at the one or more eNBs.

5. The apparatus of claim 1, wherein the transmission mode for the B-PDCCH includes only one control cluster in the DL control region.

6. The apparatus of claim 5, wherein the processing circuitry is further to:
   select the transmission mode including the only one control cluster when the one or more B-PDCCHs are transmitted from one eNB with a fully connected hybrid beamforming architecture.

7. The apparatus of claim 5, wherein the only one control cluster in the DL control region includes one or more sub-clusters, wherein each of the one or more sub-clusters includes one or more demodulation reference signal (DM RS) ports and B-PDCCHs, and wherein the one or more DM RS ports and the B-PDCCHs are spatially separated.

8. The apparatus of claim 7, wherein the processing circuitry is further to:
   place the DM RS sequences for the spatially separated DM RS ports adjacently within a DM RS symbol block of each of the one or more sub-clusters.

9. The apparatus of claim 8, wherein the processing circuitry is further to:
   extract time-domain samples of the DM RS symbol block corresponding to a target sub-cluster and a neighborhood of the target sub-cluster; and
   insert zeroes for other sample positions before performing frequency-domain channel estimation.

10. The apparatus of claim 7, wherein the processing circuitry is further to:
    determine sub-cluster sizes for the one or more sub-clusters based on at least one of the channel delay spread statistics and the CP, ZT, or GI length.

11. The apparatus of claim 5, wherein the only one control cluster in the DL control region includes one or more pairs of symbol blocks, wherein each of the one or more pairs of symbol blocks includes a symbol block for one DM RS port and a symbol block for one or more B-PDCCHs, and wherein the DM RS port and the one or more B-PDCCHs in the pair of symbol blocks are associated with same transit beamforming weights.

12. The apparatus of claim 1, wherein the transmission mode for the B-PDCCH includes multiple control clusters in the DL control region, and wherein the one or more B-PDCCHs are transmitted from more than one eNB or from one eNB with a sub-array based hybrid beamforming architecture.

13. The apparatus of claim 1, wherein the network entity comprises the one or more eNBs.

14. The apparatus of claim 1, further comprising:
    transceiver circuitry to:
    receive, from the network entity, the indication of the transmission mode for the B-PDCCH; and
    receive the one or more symbol blocks corresponding to the DL control region of the subframe; and
    an antenna coupled to the transceiver circuitry.

15. The apparatus of claim 1, wherein the processing circuitry comprises a baseband processor.

16. An apparatus of a user equipment (UE), the apparatus comprising:
    processing circuitry and memory, the processing circuitry to:
    decode an indication of a transmission mode for a beamformed physical downlink control channel (B-PDCCH) received from a network entity;
    decode one or more symbol blocks corresponding to a downlink (DL) control region of a subframe, wherein the DL control region includes one or more control clusters, and wherein one discrete Fourier transform (DFT) spreading window is applied in each of the one or more control clusters;

decode an indication of a cyclic prefix (CP), zero tail (ZT), or guard interval (GI) length received from the network entity;

determine, based on the indicated CP, ZT, or GI length, a B-PDCCH search space according to the indicated transmission mode, wherein the B-PDCCH search space is a set of B-PDCCH candidate locations; and perform blind decoding of one or more B-PDCCHs based on the determined B-PDCCH search space, to obtain downlink control information transmitted from one or more evolved NodeBs (eNBs) to the UE via the one or more B-PDCCHs.

17. The apparatus of claim 16, wherein the transmission mode for the beamformed B-PDCCH is determined according to a beamforming architecture at the one or more eNBs.

18. The apparatus of claim 16, wherein the transmission mode for the beamformed B-PDCCH includes only one control cluster in the DL control region.

19. The apparatus of claim 18, wherein the processing circuitry is further to:

select the transmission mode including the only one control cluster when the one or more B-PDCCHs are transmitted from one eNB with a fully connected hybrid beamforming architecture.

20. The apparatus of claim 18, wherein the only one control cluster in the DL control region includes one or more sub-clusters, wherein each of the one or more sub-clusters includes one or more demodulation reference signal (DM RS) ports and B-PDCCHs, and wherein the one or more DM RS ports and the B-PDCCHs are spatially separated.

21. The apparatus of claim 20, wherein the processing circuitry is further to:

place the DM RS sequences for the spatially separated DM RS ports adjacently within a DM RS symbol block of each of the one or more sub-clusters.

22. The apparatus of claim 21, wherein the processing circuitry is further to:

extract time-domain samples of the DM RS symbol block corresponding to a target sub-cluster and a neighborhood of the target sub-cluster; and insert zeroes for other sample positions before performing frequency-domain channel estimation.

23. The apparatus of claim 20, wherein the processing circuitry is further to:

determine sub-cluster sizes for the one or more sub-clusters based on at least one of the channel delay spread statistics and the CP, ZT, or GI length.

24. A non-transitory machine-readable medium comprising instructions that, when executed by one or more processors of a machine, cause the one or more processors to:

decode an indication of a transmission mode for a beamformed physical downlink control channel (B-PDCCH) received from a network entity;

decode one or more symbol blocks corresponding to a downlink (DL) control region of a subframe, wherein the DL control region includes one or more control clusters, and wherein one discrete Fourier transform (DFT) spreading window is applied in each of the one or more control clusters;

determine a B-PDCCH search space according to the indicated transmission mode, wherein the B-PDCCH search space is a set of B-PDCCH candidate locations; and perform blind decoding of one or more B-PDCCHs based on the determined B-PDCCH search space, to obtain downlink control information transmitted from one or more evolved NodeBs (eNBs) to the UE via the one or more B-PDCCHs.

* * * * *